(12) United States Patent
Kohberg et al.

(10) Patent No.: US 11,591,945 B2
(45) Date of Patent: Feb. 28, 2023

(54) EXHAUST GAS TREATMENT ARRANGEMENT FOR AN EXHAUST GAS SYSTEM OF AN INTERNAL COMBUSTION ENGINE

(71) Applicant: Purem GmbH, Neunkirchen (DE)

(72) Inventors: Carsten Kohberg, Wendlingen (DE); Markus Henzler, Grafenberg (DE); Arthur Wieland, Baltmannsweiler (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/694,189

(22) Filed: Mar. 14, 2022

(65) Prior Publication Data

US 2022/0290598 A1    Sep. 15, 2022

(30) Foreign Application Priority Data

Mar. 15, 2021   (DE) ..................... 10 2021 106 167.9

(51) Int. Cl.
*F01N 3/20*  (2006.01)
*F01N 3/28*  (2006.01)

(52) U.S. Cl.
CPC ......... *F01N 3/2066* (2013.01); *F01N 3/2892* (2013.01); *F01N 2240/20* (2013.01); *F01N 2610/02* (2013.01)

(58) Field of Classification Search
CPC ........ F01N 3/2006; F01N 3/2892; F01N 3/10; F01N 3/20; F01N 3/00; F01N 3/28; F01N 3/24; F01N 2240/20; F01N 2610/02; F01N 13/00; F01N 3/005

USPC ......................................................... 60/299
See application file for complete search history.

(56) References Cited

U.S. PATENT DOCUMENTS

| | | | |
|---|---|---|---|
| 2014/0250865 A1* | 9/2014 | Bentley | F01N 3/2066 60/277 |
| 2019/0024550 A1* | 1/2019 | Curras-Guede | B04C 3/06 |
| 2021/0017893 A1* | 1/2021 | Kalyanshetti | F01N 13/08 |

FOREIGN PATENT DOCUMENTS

| | | | | |
|---|---|---|---|---|
| CN | 113153505 A | * | 7/2021 | ............ F01N 13/00 |
| DE | 10 2019 121 988 A1 | | 2/2021 | |
| EP | 3904664 A1 | * | 11/2021 | .......... B01D 53/265 |
| GB | 2476049 A | | 6/2011 | |
| JP | H09-125944 A | | 5/1997 | |

\* cited by examiner

*Primary Examiner* — Devon C Kramer
*Assistant Examiner* — Kelsey L Stanek
(74) *Attorney, Agent, or Firm* — Walter Ottesen, P.A.

(57) ABSTRACT

An exhaust gas treatment arrangement for an exhaust gas system of an internal combustion engine includes an exhaust gas channel leading to a flow path switching unit. The flow path switching unit is configured for changing exhaust gas parts of an exhaust gas stream flowing through the exhaust gas channel, which are conducted into first and second exhaust gas flow paths downstream of the flow path switching unit. The first exhaust gas flow path and the second exhaust gas flow path lead to an exhaust gas outlet. An SCR catalyst unit is in the first exhaust gas flow path upstream of the exhaust gas outlet. A liquid bypass line drains liquid from a liquid collection region in the exhaust gas channel upstream relative to the switching unit. The liquid is drained to a liquid discharge region for discharging liquid into the second flow path downstream of the switching unit.

14 Claims, 4 Drawing Sheets

EXHAUST GAS TREATMENT ARRANGEMENT FOR AN EXHAUST GAS SYSTEM OF AN INTERNAL COMBUSTION ENGINE

CROSS REFERENCE TO RELATED APPLICATION

This application claims priority of German patent application no. 10 2021 106 167.9, filed Mar. 15, 2021, the entire content of which is incorporated herein by reference.

TECHNICAL FIELD

The present disclosure is directed to an exhaust gas treatment arrangement which may be used in an exhaust gas system of an internal combustion engine, in particular in a vehicle, to subject exhaust gas expelled by the internal combustion engine to an exhaust gas cleaning process.

BACKGROUND

To reduce the proportion of contaminants in the exhaust gas expelled from an internal combustion engine, it is known to use various exhaust gas treatment units, such as for example catalysts and particle filters. For example, in connection with diesel internal combustion engines, it is known to use SCR catalysts to reduce the level of nitrogen oxide in the exhaust gas.

SUMMARY

It is an object of the present disclosure to provide an exhaust gas treatment arrangement for an exhaust gas system of an internal combustion engine which avoids restricting the functionality of an SCR catalyst, arranged in the exhaust gas flow path, by hydrocarbon particles carried along in the exhaust gas stream.

According to the disclosure, this object is achieved by an exhaust gas treatment arrangement for an exhaust gas system of an internal combustion engine. This exhaust gas treatment arrangement includes:
  an exhaust gas channel leading to a flow path switching unit, wherein the flow path switching unit is configured for changing exhaust gas parts of an exhaust gas stream flowing through the exhaust gas channel, which are conducted into a first exhaust gas flow path downstream of the flow path switching unit and into a second exhaust gas flow path downstream of the flow path switching unit, wherein the first exhaust gas flow path and the second exhaust gas flow path lead to an exhaust gas outlet,
  an SCR catalyst arrangement in the first exhaust gas flow path upstream of the exhaust gas outlet,
  a liquid bypass line for draining liquid from a liquid collection region in the exhaust gas channel upstream relative to the flow path switching unit to a liquid discharge region for discharging liquid into the second exhaust gas flow path downstream of the flow path switching unit.

In the exhaust gas treatment arrangement constructed according to the disclosure, it is in principle possible, depending on the operating state of an internal combustion engine or an exhaust gas system, to conduct a greater or smaller part of the exhaust gas stream through the first exhaust gas flow path and hence through the SCR catalyst arrangement, or through the second exhaust gas stream, fluidically parallel to the first exhaust gas stream, and hence bypass the SCR catalyst arrangement. Depending on the operating state of an internal combustion engine, or an injector arranged upstream of such an exhaust gas treatment arrangement, via which liquid hydrocarbon—that is, fuel—can be introduced into the exhaust gas stream, for example in order to carry out a cleaning of the particle filter in an exhaust gas treatment system including a particle filter, the exhaust gas stream contains a greater or smaller part of liquid hydrocarbon carried along in droplet form. Since such liquid hydrocarbons can restrict the functionality of the catalyst material of an SCR catalyst arrangement, the structure according to the disclosure ensures that liquid, that is, for example, liquid hydrocarbon carried in the exhaust gas stream, is separated from the exhaust gas stream in the liquid collection region, where it can collect in order then to be conducted via the liquid bypass line into the second exhaust gas flow path further downstream. This largely avoids the penetration of liquid, that is, unburned hydrocarbon, into the first exhaust gas flow path and hence into the SCR catalyst arrangement.

However, the hydrocarbon may be used further downstream, in particular downstream of the SCR catalyst arrangement, for example in a particle filter, in order to increase the temperature, for example for burning off soot particles which have been deposited on the particle filter.

For an efficient separation of liquid from the exhaust gas stream, the liquid collection region in the exhaust gas channel may include a liquid collection volume which is open in the upstream direction and substantially closed in the downstream direction, and a liquid drainage opening which is open to the liquid bypass line, wherein to avoid adversely affecting the exhaust gas flow, preferably the liquid collection volume surrounds an exhaust gas flow volume in the exhaust gas channel in the manner of a ring.

The liquid collection volume may be formed between a wall of a first exhaust gas channel element of the exhaust gas channel and a wall of a second exhaust gas channel element. For this, the second exhaust gas channel element may be inserted in the first exhaust gas channel element, for example in a downstream end of the first exhaust gas channel element, and the liquid collection volume may be formed between a portion of the wall of the second exhaust gas channel element extending in the first exhaust gas channel element and a portion of the wall of the first exhaust gas channel element surrounding the second exhaust gas channel element.

In an embodiment, it is proposed that the SCR catalyst arrangement is arranged in a housing providing the exhaust gas outlet or leading to the exhaust gas outlet, and an outlet opening of the SCR catalyst arrangement is open to the exhaust gas outlet, and the second exhaust gas flow path includes an inner volume of the housing which receives the SCR catalyst arrangement and leads to the exhaust gas outlet. The SCR catalyst arrangement thus lies in a volume through which flows exhaust gas flowing in the second exhaust gas flow path, so that this exhaust gas stream may be used to transmit heat to the SCR catalyst arrangement and also heat this from the outside or keep it at a temperature necessary for performance of a catalytic reaction.

The liquid discharge region may for example be open to the inner volume of the housing.

To create the different exhaust gas flow paths, the first exhaust gas flow path may include a first exhaust gas conduction arrangement for conducting exhaust gas from the flow path switching unit to a first exhaust gas inlet of the housing, wherein an inlet opening of the SCR catalyst arrangement is open to and/or provides the first exhaust gas inlet of the housing, and the second exhaust gas flow path may include a second exhaust gas conduction arrangement for conducting exhaust gas from the flow path switching unit to a second exhaust gas inlet of the housing which is open to the inner volume of the housing.

If the liquid discharge region is here arranged on the housing adjacent to the second exhaust gas inlet, a Venturi effect is created by the exhaust gas stream in the second exhaust gas flow path on entry into the inner volume of the housing, which supports the discharge of liquid conducted through the liquid bypass line into the inner volume of the housing.

In a configuration which is simple to implement, the flow path switching unit may include a regulating valve arrangement.

The disclosure furthermore concerns an exhaust gas system for an internal combustion engine, including an exhaust gas treatment arrangement constructed according to the disclosure.

In order, in such an exhaust gas system, to be able to provide a further improved cleaning effect for the exhaust gas flowing through the system, at least one exhaust gas treatment system may be arranged downstream of the exhaust gas outlet.

Here, at least one exhaust gas treatment system may include an oxidation catalyst and/or a particle filter. Furthermore, at least one exhaust gas treatment system may include a further SCR catalyst arrangement, so that the SCR catalyst arrangement provided in the exhaust gas treatment arrangement constructed according to the disclosure provides a pre-SCR catalyst.

In order, in an exhaust gas system, to be able to use the force of gravity to drain liquid from the liquid collection volume, it is furthermore proposed that the liquid bypass line leads away from a region of the liquid collection volume which is lower in the vertical direction, and/or the liquid discharge region is arranged below the liquid collection volume in the vertical direction. In this context, it is pointed out that the vertical direction in a ground coordinate system corresponds substantially to the height direction, that is, the direction of gravity.

DESCRIPTION OF THE PREFERRED EMBODIMENTS

Figure 1:
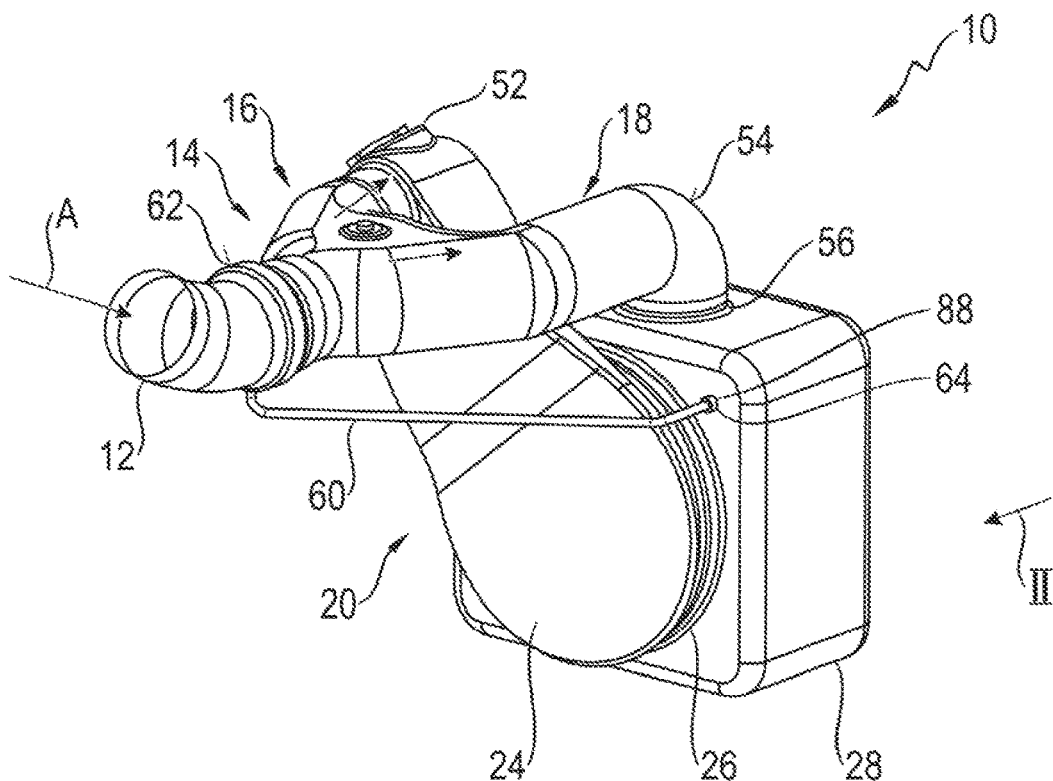
FIG. 1 is a perspective view of an exhaust gas treatment arrangement with two parallel exhaust gas flow paths, in view direction I in FIG. 2.
Figure 2:
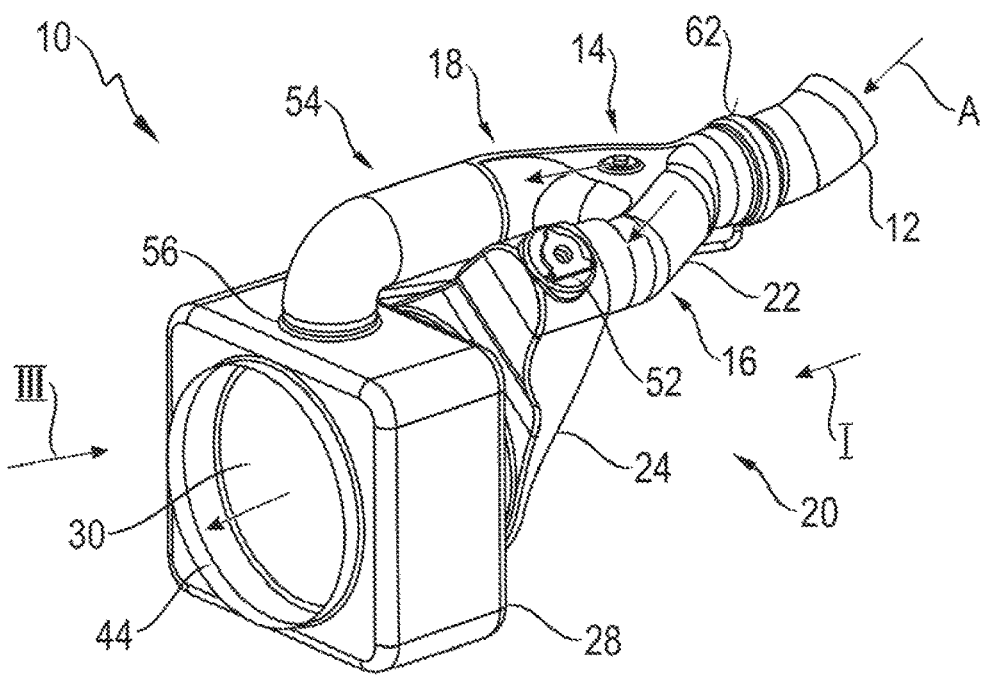
FIG. 2 is another perspective view of the exhaust gas treatment arrangement in view direction II in FIG. 1.
Figure 3:
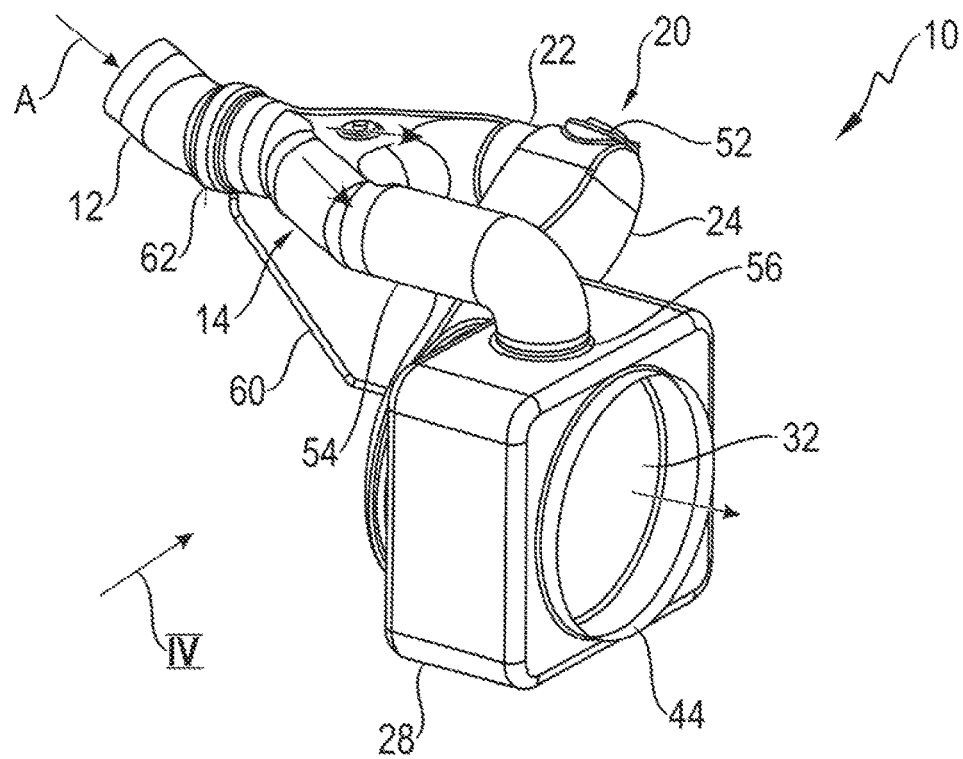
FIG. 3 is a further perspective view of the exhaust gas treatment arrangement in view direction III in FIG. 2.
Figure 4:
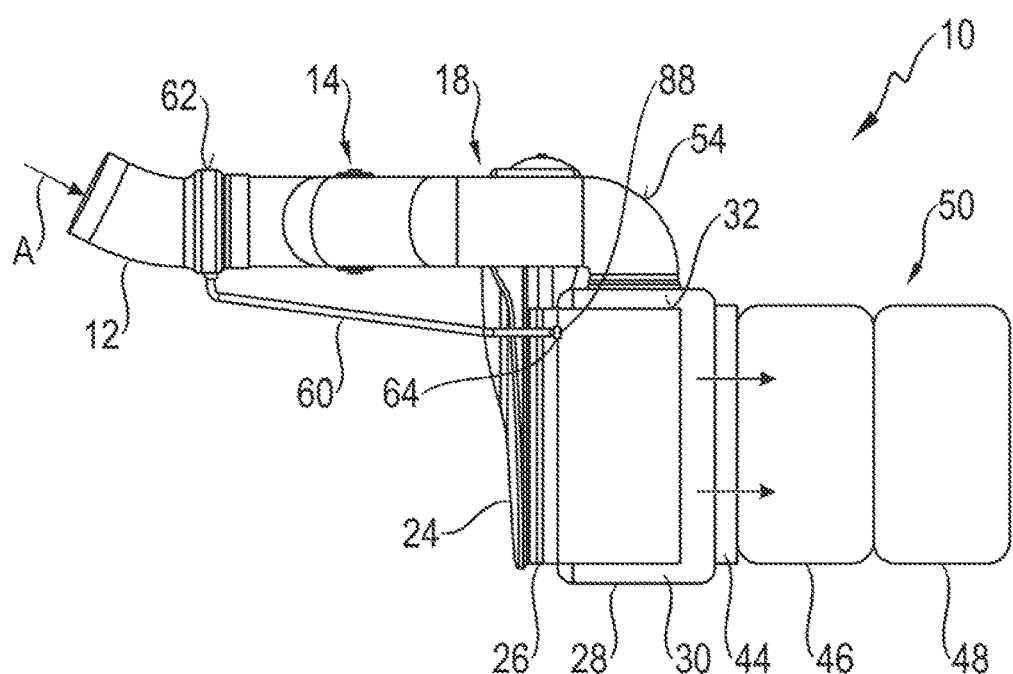
FIG. 4 is a side view of the exhaust gas treatment arrangement in view direction IV in FIG. 3.

FIGS. 1 to 5 show, in various perspective illustrations, an exhaust gas treatment arrangement 10 for an exhaust gas system of an internal combustion engine. The exhaust gas treatment arrangement 10 includes, as an upstream system region, an exhaust gas channel (generally designated with 12), through which the exhaust gas stream A expelled from an internal combustion engine flows. The exhaust gas channel 12 leads to a flow path switching unit 14 which is configured or works in the manner of a flow switch. At the flow path switching unit 14, the stream branches into a first exhaust gas flow path 16 and a second exhaust gas flow path 18 which is fluidically, that is, not necessarily geometrically, parallel to the first exhaust gas flow path 16.

The first exhaust gas flow path 16 includes a first exhaust gas conduction arrangement (generally designated with 20) with a tubular line portion 22 leading away from the flow path switching unit 14, and a line portion 24 connected to the line portion 22 and configured as a housing. The line portion 24 leads to a first exhaust gas inlet 26 of a housing 28, configured for example as a box.

Figure 5:
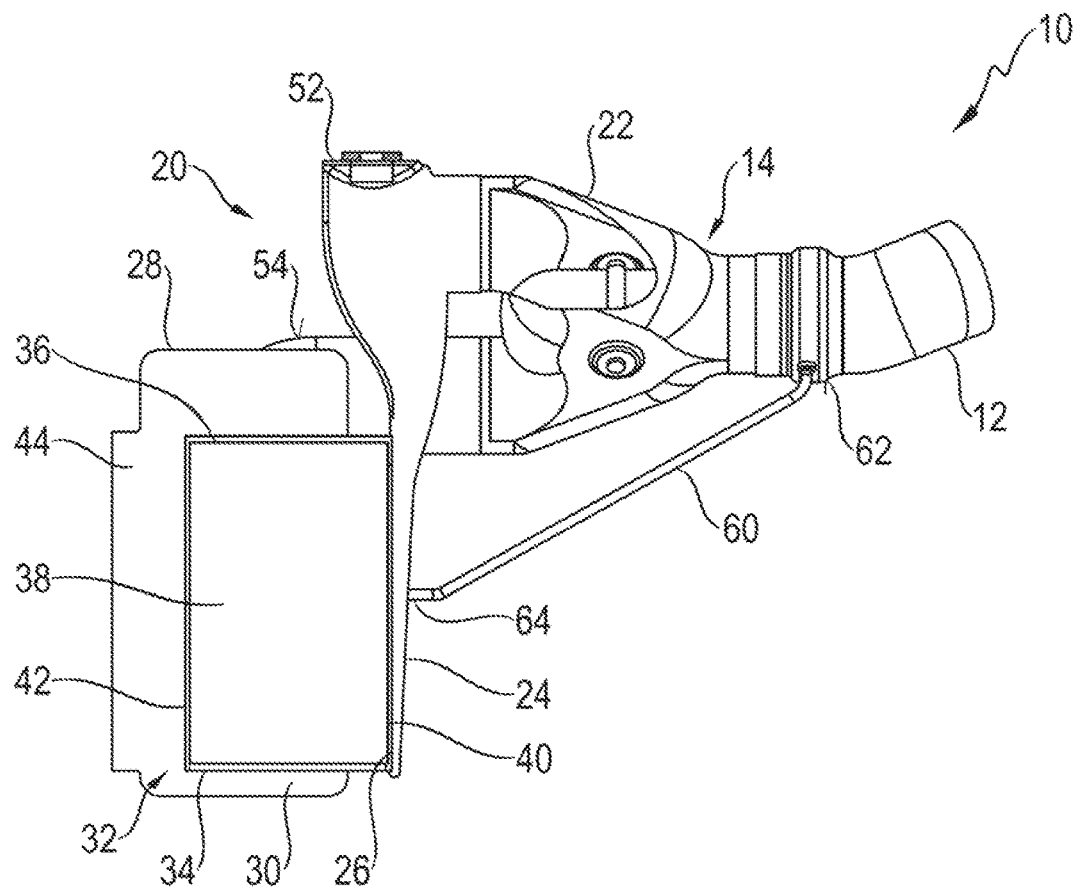
FIG. 5 shows the exhaust gas treatment arrangement with cut-open housing.

An SCR catalyst arrangement (generally designated with 32) is arranged in an inner volume 30 of the housing 28, which is shown open in FIG. 5. This includes a tubular casing 34 in which, for example, a porous- and hence permeable to exhaust gas-exhaust gas treatment element 38, made from and/or coated with catalytically active material, is supported by a fiber matting 36 or similar. An inlet opening 40 of the SCR catalyst arrangement 32 is open to or provides the first exhaust gas inlet 26 of the housing 28, so that exhaust gas conducted through the line portion 24 or the first exhaust gas flow path 16 flows into the inlet opening 40 of the SCR catalyst arrangement 32 and thus flows through the exhaust gas treatment element 38 thereof.

An outlet opening 42 of the SCR catalyst arrangement 32 lies opposite an exhaust gas outlet 44 provided on the housing 28 so that, after emerging from the outlet opening 42, the exhaust gas flowing through the SCR catalyst arrangement 32 flows in the direction towards the exhaust gas outlet 44 and, via the outlet 44 of the exhaust gas treatment arrangement 10, for example to further exhaust gas treatment systems 46, 48 of an exhaust gas system, which is generally designated with 50 and also includes the exhaust gas treatment arrangement 10, of an internal combustion engine. The further exhaust gas treatment systems 46, 48 may, for example, include an oxidation catalyst, in particular a diesel oxidation catalyst, a particle filter, in particular a diesel particle filter, and a further SCR catalyst arrangement, so that the SCR catalyst arrangement 32 arranged in the housing 28 constitutes a pre-SCR catalyst.

The reactant necessary for performing a selective catalytic reduction in the SCR catalyst arrangement 32, for example a urea/water solution, may be injected by an injector (not shown in the figures) in the area of an injection region 52 in the line portion 22, and mixed with the exhaust gas as it flows through the first exhaust gas flow path 16 before entering the SCR catalyst arrangement 32.

The second exhaust gas flow path 18, connected to the flow path switching unit 14, includes a second exhaust gas conduction arrangement 54 which may for example be tubular or configured as a manifold. This conducts the exhaust gas stream flowing in the second exhaust gas flow path 18 in the direction towards a second exhaust gas inlet 56 of the housing 28. Via the second inlet 56, the exhaust gas conduction arrangement 54 is open to the inner volume 30 of the housing 28, so that this inner volume 30 provides a part of the second exhaust gas flow path 18 leading to the exhaust gas outlet 44. The exhaust gas flowing in the second exhaust gas flow path 18 through the inner volume 30 flows around the SCR catalyst arrangement 32 on its outside and may therefore transmit heat to this. The exhaust gas stream flowing through the second exhaust gas flow path 18 does not enter the SCR catalyst arrangement 32 in the region of the outlet opening 42 since, because of the substantially lower flow resistance, the exhaust gas stream flowing through the inner volume 30 (and indicated with flow arrows) flows directly to the exhaust gas outlet 44 and the following part of the exhaust gas system 50.

Figure 6:
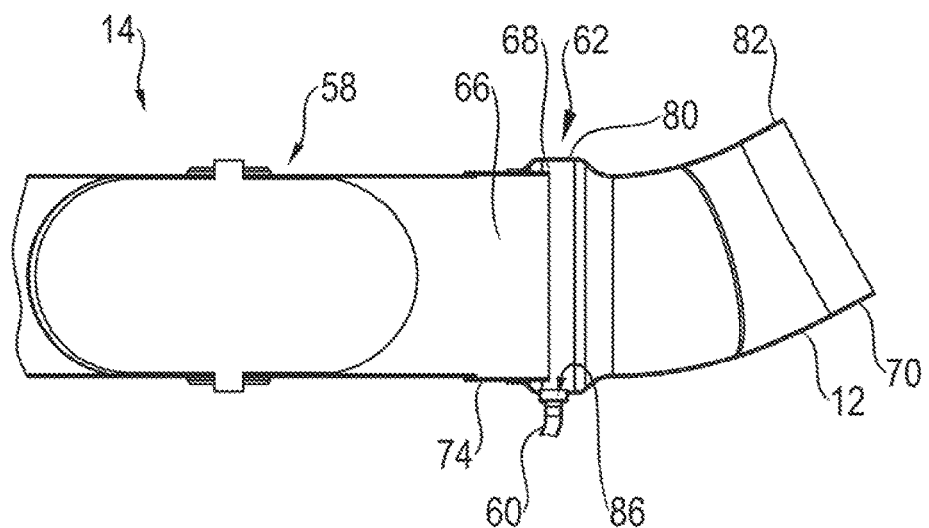
FIG. 6 is a cut-open view of an exhaust gas channel of the exhaust gas treatment arrangement; and, FIG. 7 shows an enlarged extract from FIG. 6 in the area of a liquid collection region.

The flow path switching unit 14 may include a regulating valve arrangement 58 indicated in general in FIG. 6. The regulating valve arrangement 58 may for example be configured so as to be switchable between two regulating states. In one of the regulating states, the second exhaust gas flow path 18 is blocked against through-flow and the first exhaust gas flow path 16 is opened for through-flow. In the second regulating state, the first exhaust gas flow path 16 is blocked and the second exhaust gas flow path 18 is opened for through-flow. In an alternative embodiment of the flow path switching unit 14, the regulating valve arrangement 58 may be formed in the manner of a throttle valve used in exhaust gas systems, which for example may be arranged in the region of the flow path switching unit 14 leading to the second exhaust gas flow path 18. With a regulating valve arrangement constructed or acting in such a fashion, in a first regulating state the second exhaust gas flow path 18 is opened for through-flow, while in a second regulating state the second exhaust gas flow path 18 is substantially blocked against through-flow. Since the first exhaust gas flow path 16 offers a significantly greater flow resistance for the exhaust gas because of the provision of the SCR catalyst arrangement 32 in the first exhaust gas flow path 16, when the second exhaust gas flow path 18 is opened for through-flow, the exhaust gas stream A guided thereto via the exhaust gas channel 12 flows substantially completely through the second exhaust gas flow path 18.

If the exhaust gas stream A is to be divided, the regulating valve arrangement 58 may be brought into an intermediate position in which it does not fully block or fully open either of the two exhaust gas flow paths 16, 18, so that for example, for efficient heating of the exhaust gas treatment element 38 of the SCR catalyst arrangement 32, a part of the exhaust gas stream A is conducted through the exhaust gas treatment element 38 via the first exhaust gas flow path 16, and the remaining part of the exhaust gas stream A flows into the inner volume 30 of the housing 28 via the second exhaust gas flow path 18, and by flowing around the casing 34 of the SCR catalyst arrangement 32, transmits heat thereto from the outside.

Figure 7:
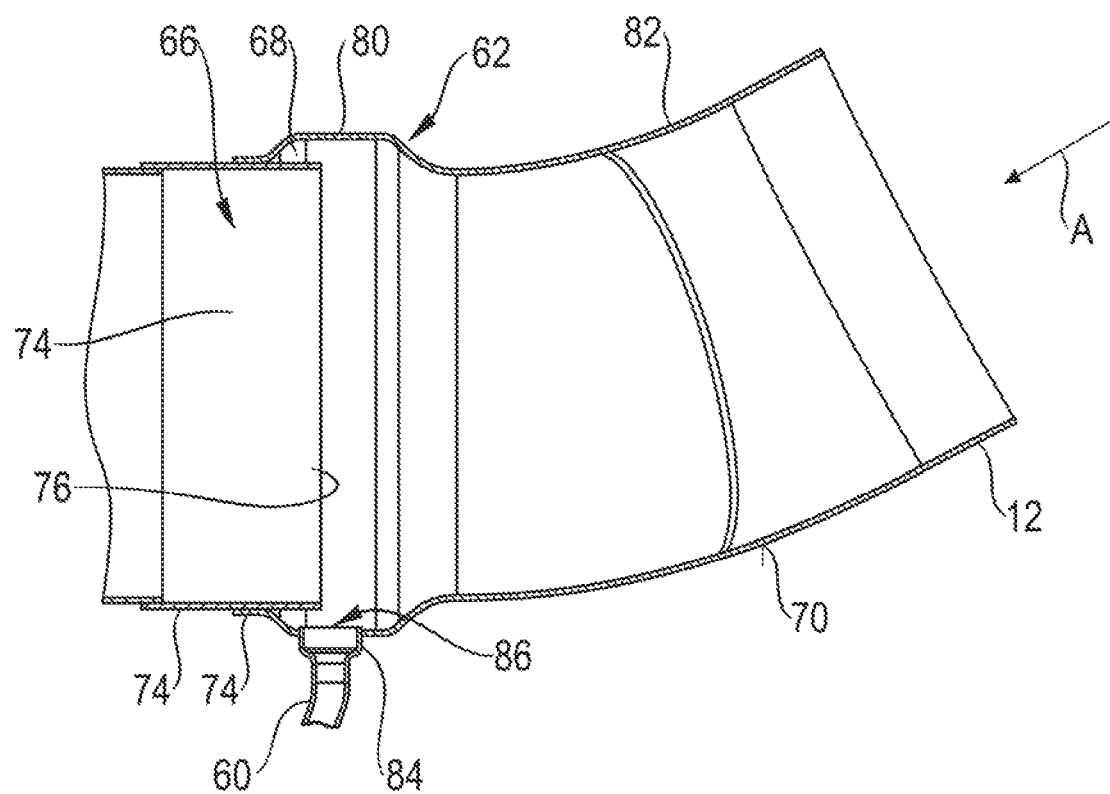

The exhaust gas treatment arrangement 10 furthermore includes a liquid bypass line 60, configured for example as a tube. This leads from a liquid collection region 62 formed on the exhaust gas channel 12 to a liquid discharge region 64 formed on the housing 28. The liquid collection region shown in detail in FIG. 7 includes, in the exhaust gas channel 12, a liquid collection volume 68 surrounding an exhaust gas flow volume 66 in the exhaust gas channel 12 in the manner of a ring. This is open in the upstream direction and substantially closed in the downstream direction.

In the embodiment illustrated, the exhaust gas channel 12 includes a first exhaust gas channel element 70 and, for example, a tubular second exhaust gas channel element 74, which is inserted in a downstream end 72 of the first exhaust gas channel element 70. A portion 76 of a wall 78 of the second exhaust gas channel element 74 extends in the upstream direction into the first exhaust gas channel element 70, and is surrounded by an annular bulging region 80 of a wall 82 of the first exhaust gas channel element 70. Thus the transition from the first exhaust gas channel element 70 to the second exhaust gas channel element 74 substantially offers no flow constriction, while at the same time the liquid collection volume 68 open in the upstream direction is formed.

At a peripheral region of the liquid collection volume 68, the liquid bypass line 60 is connected to a connector 84 on the wall 82 of the first exhaust gas channel element 70. In the region of this connector 84, a liquid drainage opening 86 is formed, via which the liquid collection volume 68 is open to the liquid bypass line 60. The liquid bypass line 60 leads to the housing 28 or to a connector 88 arranged adjacent to the second exhaust gas inlet 56, via which connector the liquid bypass line 60 is connected to the housing 28, and the liquid discharge region 64 is open to the inner volume 30 immediately adjacent to the second exhaust gas inlet 56.

The liquid drainage opening 86 is provided on the liquid collection volume 68 in a lower region in the vertical direction, that is, in a direction of gravity, so that liquid collecting under the effect of gravity in the liquid collection volume 68 flows towards the liquid drainage opening 86 and through this into the liquid bypass line 60. Furthermore, the liquid discharge region 64 is arranged below the liquid collection volume 68 in this vertical direction, so that under the effect of gravity, the liquid coming from the liquid collection volume 68 is conducted to the liquid discharge region 64 and via this into the second exhaust gas flow path.

Depending on the operating state of an internal combustion engine, or an injector for liquid hydrocarbon—that is, fuel—arranged upstream of the exhaust gas channel 12, the exhaust gas stream A may contain unburned liquid hydrocarbon carried along in droplet form. This may or should for example be used in one of the exhaust gas treatment systems 46 or 48 in order to increase the temperature there by oxidation, that is, combustion. For example, this may be used in a particle filter in order to burn off soot particles which have deposited there. Since the introduction of unburned liquid hydrocarbon into the SCR catalyst arrangement 32 should be avoided, the liquid bypass line 60 bridges the flow path switching unit 14, so irrespective of the latter's regulating state, liquid hydrocarbon which has been separated from the exhaust gas stream A in the liquid collection region 62, and hence collected there, is conducted into the second exhaust gas flow path 18 downstream of the flow path switching unit 14, and thus, like the entire exhaust gas flow path 18, conducted parallel to the first exhaust gas flow path 16 containing the SCR catalyst arrangement 32. The risk of liquid hydrocarbon entering the SCR catalyst arrangement 32 may thus be largely excluded. However, liquid hydrocarbon collecting in the region of the liquid collection region 62 may be used further downstream, in particular also downstream of the SCR catalyst arrangement 32, in the following exhaust gas treatment systems 46 or 48 in the manner described above.

It is understood that the foregoing description is that of the preferred embodiments of the invention and that various changes and modifications may be made thereto without departing from the spirit and scope of the invention as defined in the appended claims.

What is claimed is:

1. An exhaust gas treatment arrangement for an exhaust gas system of an internal combustion engine, the exhaust gas treatment arrangement comprising:
   an exhaust gas channel for conducting an exhaust gas stream (A) therethrough;
   a flow path switching unit disposed downstream of said exhaust gas channel;

said flow path switching unit being configured to change first and second exhaust gas components of said exhaust gas stream (A) and direct said first and second exhaust gas components along first and second flow paths, respectively, downstream of said flow path switching unit;
an exhaust gas outlet;
said first and second flow paths being arranged to lead to said exhaust gas outlet from said flow path switching unit;
an SCR catalyst unit disposed in said first flow path upstream of said exhaust gas outlet;
a liquid collection region arranged in said exhaust gas channel upstream relative to said flow path switching unit;
a liquid discharge region for discharging liquid into said second exhaust gas flow path downstream of said flow path switching unit; and,
a liquid bypass line for draining liquid from said liquid collection region to said liquid discharge region.

2. The exhaust gas treatment arrangement of claim 1, wherein said liquid collection region includes a liquid collection volume open in the upstream direction and closed in the downstream direction; and, a liquid drainage outlet opening into said liquid bypass line.

3. The exhaust gas treatment arrangement of claim 2, wherein said liquid collection volume is configured to surround an exhaust gas flow volume of said exhaust gas stream (A) in a manner of an annulus.

4. The exhaust gas treatment arrangement of claim 2, wherein said exhaust gas channel includes first and second exhaust gas channel elements defining first and second walls, respectively; and, said first wall and said second wall conjointly define an interface and said liquid collection volume is formed at said interface.

5. The exhaust gas treatment arrangement of claim 4, wherein said second exhaust gas channel element is inserted into said first exhaust gas element; and, said liquid collection volume is formed between a portion of said second wall extending into said first exhaust gas channel element and a portion of said first wall surrounding said second exhaust gas channel element.

6. The exhaust gas treatment arrangement of claim 1, further comprising:
a housing having said exhaust gas outlet or leading to said exhaust gas outlet;
said SCR catalyst unit being mounted in said housing;
said SCR catalyst unit having an outlet communicating with said exhaust gas outlet;
said second exhaust gas flow path including an inner volume of said housing wherein said SCR catalyst unit is accommodated; and,
said inner volume leading to said exhaust gas outlet.

7. The exhaust gas treatment arrangement of claim 6, wherein said liquid discharge region is open to said inner volume of said housing.

8. The exhaust gas treatment arrangement of claim 6, wherein at least one of the following applies:
i) said housing includes a first exhaust gas inlet; said first exhaust gas flow path includes a first exhaust gas conduction arrangement for conducting exhaust gas from said flow path switching unit to said first exhaust gas inlet of said housing and wherein at least one of the following applies:
a) said SCR catalyst unit has an inlet open to said first exhaust gas inlet of said housing; and,
b) said SCR catalyst unit has an inlet made available as said first exhaust gas inlet;
ii) said housing includes a second exhaust gas inlet; and,
iii) said second exhaust gas flow path includes a second exhaust gas conducting arrangement for conducting exhaust gas from said flow path switching unit to said second exhaust gas inlet open to said interior volume of said housing.

9. The exhaust gas treatment arrangement of claim 8, wherein said liquid discharge region is arranged on said housing adjacent to said second exhaust gas inlet.

10. The exhaust gas treatment arrangement of claim 1, wherein said flow path switching unit includes a regulating valve arrangement.

11. An exhaust gas system for an internal combustion engine, the exhaust gas system comprising:
an exhaust gas treatment arrangement including:
an exhaust gas channel for conducting an exhaust gas stream (A) therethrough;
a flow path switching unit disposed downstream of said exhaust gas channel;
said flow path switching unit being configured to change first and second exhaust gas components of said exhaust gas stream (A) and direct said first and second exhaust gas components along first and second flow paths, respectively, downstream of said flow path switching unit;
an exhaust gas outlet;
said first and second flow paths being arranged to lead to said exhaust gas outlet from said flow path switching unit;
an SCR catalyst unit disposed in said first flow path upstream of said exhaust gas outlet;
a liquid collection region arranged in said exhaust gas channel upstream relative to said flow path switching unit;
a liquid discharge region for discharging liquid into said second exhaust gas flow path downstream of said flow path switching unit; and,
a liquid bypass line for draining liquid from said liquid collection region to said liquid discharge region.

12. The exhaust gas system of claim 11, wherein at least one exhaust gas treatment system is arranged downstream of said exhaust gas outlet.

13. The exhaust gas system of claim 12, wherein said at least one exhaust gas treatment system includes at least one of the following: an oxidation catalyst, a particle filter and an additional SCR catalyst arrangement.

14. The exhaust gas system of claim 11, wherein at least one of the following applies:
a) said liquid bypass line leads away from a region of said liquid collection volume lower in a vertical direction; and,
b) said liquid discharge region is arranged below said liquid collection volume in said vertical direction.

\* \* \* \* \*